(12) United States Patent
Olson

(10) Patent No.: US 7,198,293 B2
(45) Date of Patent: Apr. 3, 2007

(54) SIDE IMPACT AIR BAG WITH HEAD PROTECTION REGION

(75) Inventor: Mark O. Olson, Farmington Hills, MI (US)

(73) Assignee: Key Safety Systems, Inc., Sterling Heights, MI (US)

( * ) Notice: Subject to any disclaimer, the term of this patent is extended or adjusted under 35 U.S.C. 154(b) by 87 days.

(21) Appl. No.: 10/761,449

(22) Filed: Jan. 20, 2004

(65) Prior Publication Data

US 2005/0156413 A1 Jul. 21, 2005

(51) Int. Cl.
*B60R 21/231* (2006.01)
(52) U.S. Cl. .................... 280/743.1; 280/730.2
(58) Field of Classification Search ........... 280/730.2, 280/729, 743.1, 743.2
See application file for complete search history.

(56) References Cited

U.S. PATENT DOCUMENTS

| | | | |
|---|---|---|---|
| 6,168,191 B1 * | 1/2001 | Webber et al. | 280/730.2 |
| 6,170,860 B1 * | 1/2001 | Denz et al. | 280/730.2 |
| 6,176,513 B1 * | 1/2001 | Neidert | 280/729 |
| 6,273,456 B1 * | 8/2001 | Heigl | 280/730.2 |
| 6,338,498 B1 * | 1/2002 | Niederman et al. | 280/728.2 |
| 6,394,487 B1 * | 5/2002 | Heudorfer et al. | 280/729 |
| 6,454,298 B1 * | 9/2002 | Hardig et al. | 280/730.2 |
| 6,527,296 B2 * | 3/2003 | Bakhsh et al. | 280/730.2 |
| 6,695,347 B2 * | 2/2004 | Sonnenberg et al. | 280/743.2 |
| 6,899,350 B2 * | 5/2005 | Bakhsh et al. | 280/730.2 |
| 2002/0005635 A1 * | 1/2002 | Nusshor | 280/730.2 |
| 2003/0132624 A1 * | 7/2003 | Hall et al. | 280/743.1 |
| 2003/0230876 A1 * | 12/2003 | Ohrvall et al. | 280/730.2 |

* cited by examiner

*Primary Examiner*—David R. Dunn
(74) *Attorney, Agent, or Firm*—Markell Seitzman

(57) ABSTRACT

An air bag assembly (20) including air bag (30) having at least a first inflatable region (32) having a plurality of restrictions peripherally located about the inflatable region and configured to restrict the degree of inflation of the air bag proximate the restrictions and configured to permit the first inflatable region of the air bag to achieve its maximum inflation in a region interior to the plurality of restrictions.

14 Claims, 5 Drawing Sheets

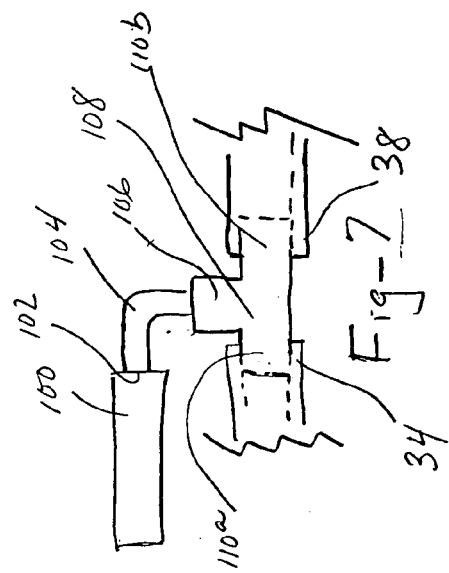
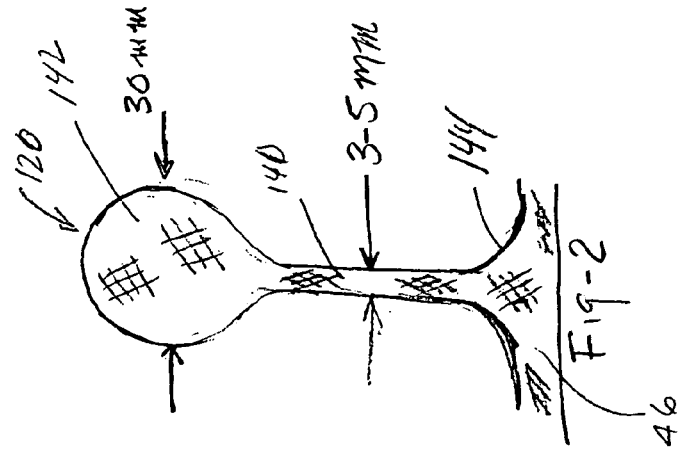
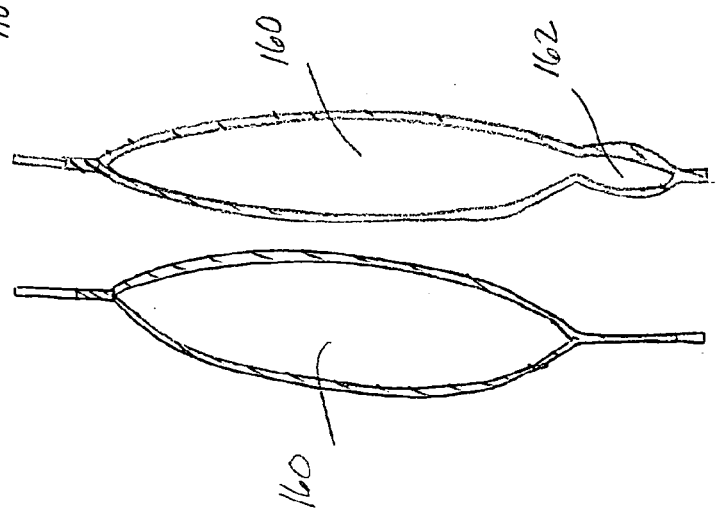
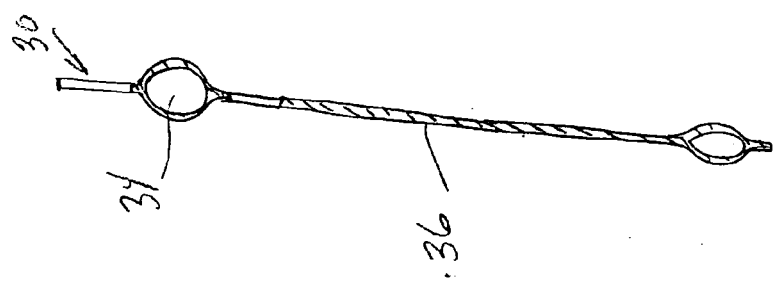

SIDE IMPACT AIR BAG WITH HEAD PROTECTION REGION

BACKGROUND AND SUMMARY OF THE INVENTION

The present invention relates to side impact air bags and more particularly to a curtain type of air bag.

Many vehicles in use today utilize a thin inflatable air bag which, when inflated, is located proximate the sides of the passenger compartment to provide an inflatable barrier, which primarily protects the upper torso and head of the vehicle occupant. These air bags are typically called "curtain" air bags and are typically mounted proximate the roof rail of the vehicle and when deployed, as mentioned above, are located proximate the sides. The length of the air bag will vary with application. Some curtain air bags are only long enough to cover a window while others extend between sets of windows and cover adjacent vehicle support structures such as the A, B, C and/or D pillars of the vehicle.

The curtain air bag is inflated by a conventional air bag inflator. The inflator is communicated to an inlet of the air bag in a conventional manner.

The curtain air bag can be constructed utilizing many techniques. For example, two separate panels can be sewn together or the panels joined by an rf weld or similar technique. The air bag can be constructed essentially as a one-piece, integrally woven air bag utilizing a known Jacquard weaving process. Each of the above techniques can be used with the present invention.

Accordingly the invention comprises: an air bag assembly comprising an air bag including at least a first inflatable region having a plurality of restrictions peripherally located about the inflatable region and configured to restrict the degree of inflation of the air bag proximate the restrictions and configured to permit the first inflatable region of the air bag to achieve its maximum inflatable size in a region interior to the plurality of restrictions. The air bag includes an inner panel and an outer panel configured to form at least the first region. The inner and outer panels are joined together along the plurality of restrictions or joints, each of which extends inwardly from near an edge of the inflatable region, each of the plurality of restrictions or joints configured to reduce local separation between the inner panel and the outer panel; the plurality of joints configured to permit the inflatable region generally in-board of the plurality of joints to achieve maximum separation between the inner and outer panels.

Many other objects and purposes of the invention will be clear from the following detailed description of the drawings.

BRIEF DESCRIPTION OF THE DRAWINGS

FIG. 2 is an enlarged view of a portion of the air bag shown in FIG. 1.

FIG. 5 is a cross-sectional view through section 5—5 of FIG. 3.

FIG. 5a illustrates a cross-sectional view through section 5a—5a of FIG. 3.

FIG. 6 is a cross-sectional view through section 6—6 of FIG. 3.

FIG. 7 is an enlarged view showing the connection of a single inflator to a plurality of bag inlets.

DETAILED DESCRIPTION OF THE DRAWINGS

Figure 1:
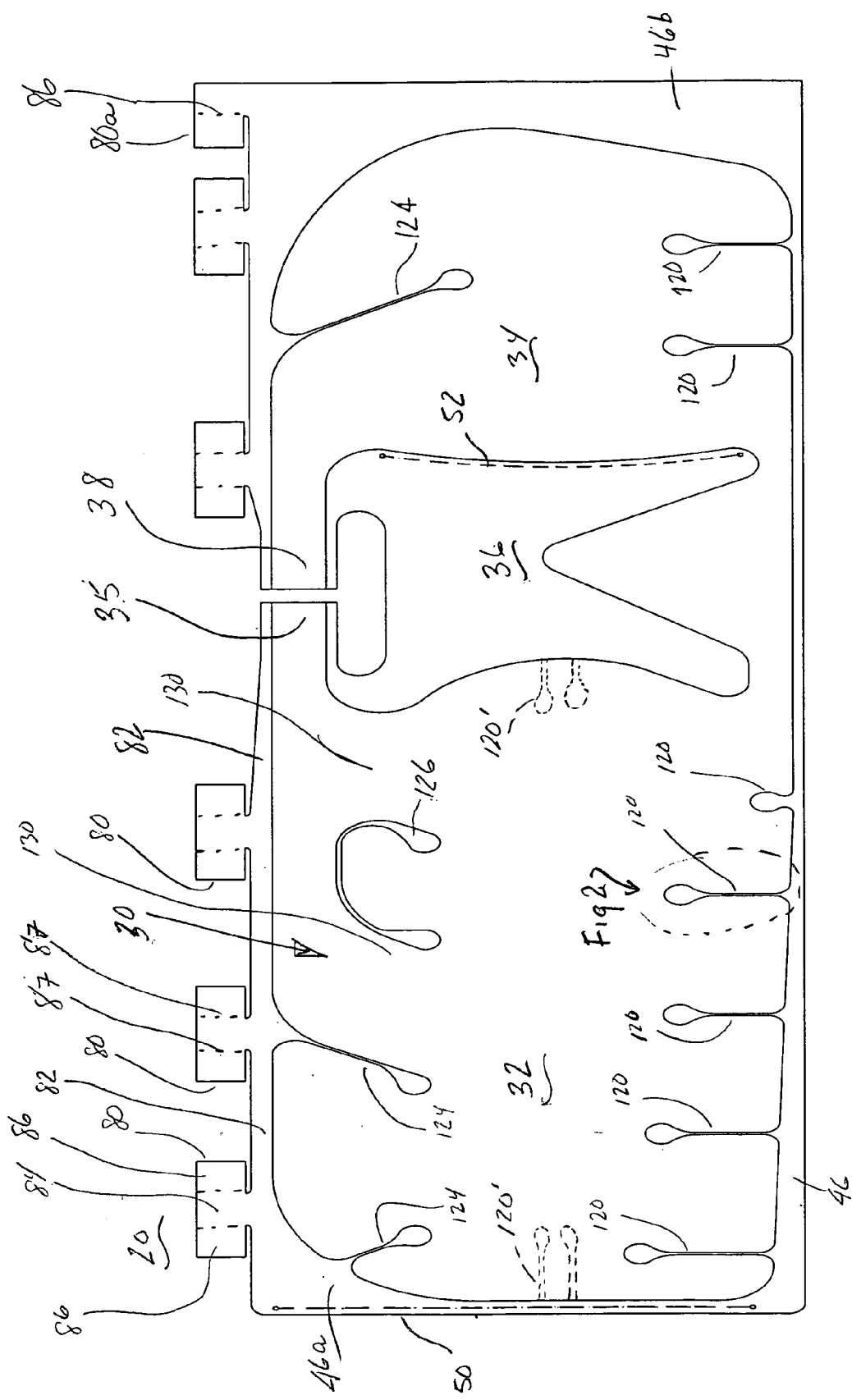
FIG. 1 is a plan view showing many of the features of the present invention.

FIG. 1 illustrates part of an air bag assembly 20 according to the present invention. The air bag assembly 20 includes an air bag 30. In the preferred embodiment of the invention, the air bag 30 is manufactured utilizing a Jacquard loom. The benefit of using a Jacquard loom is the air bag 30 is almost fully formed (finished) as it exits the loom with the exception of trimming the border of the air bag and perhaps slitting or opening the inlet or inlets of the bag. Rather than utilizing the Jacquard loom, the air bag 30 can be constructed by sewing or utilizing rf welding techniques to join two separate panels of material together.

Figure 3:
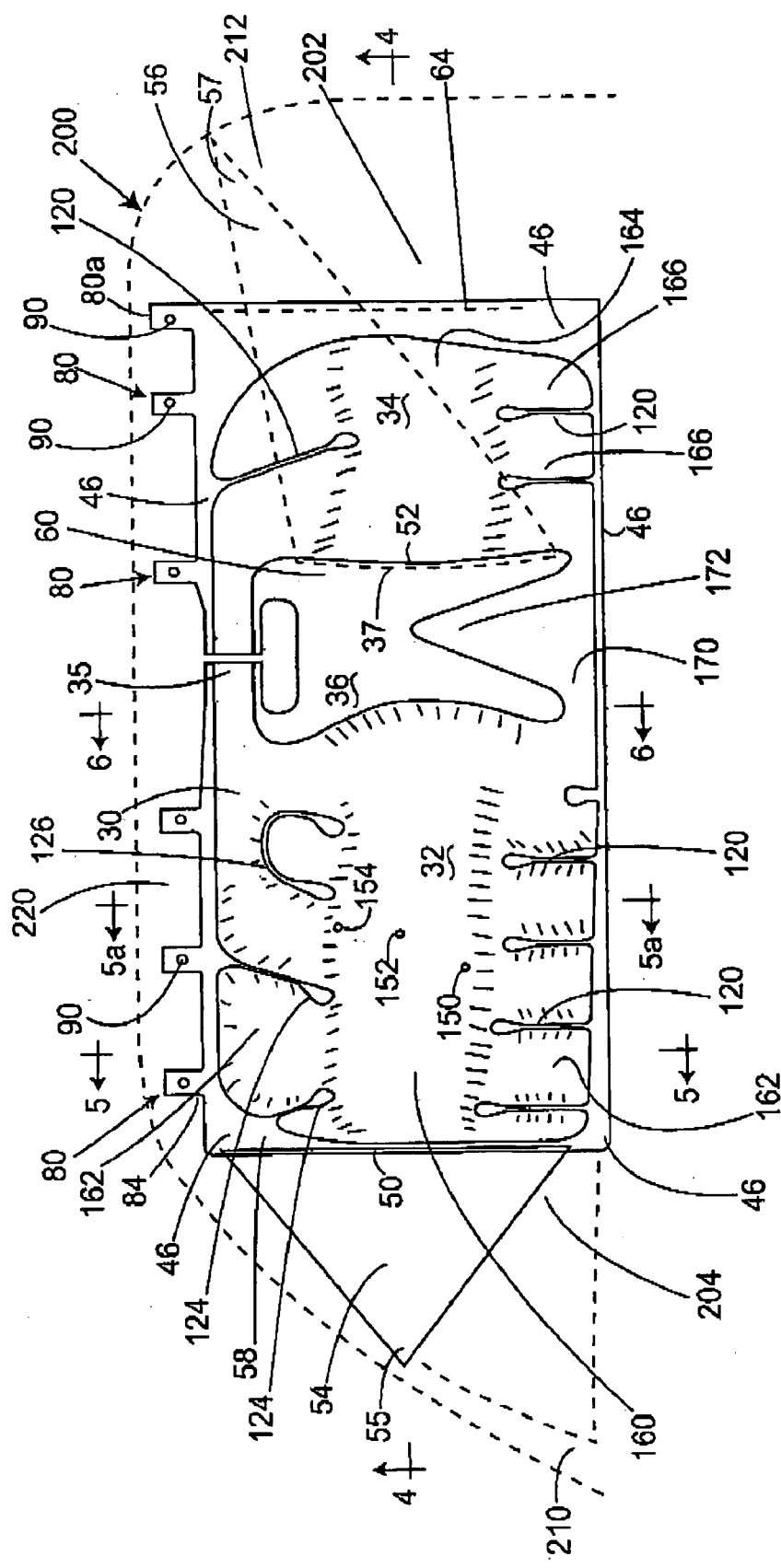
FIG. 3 shows an air bag of the present invention in an inflated state.

FIG. 1 shows the air bag 30 in an uninflated state, while FIG. 3 shows the air bag 30 inflated and situated within a passenger compartment 202 of a vehicle 200 adjacent a side 204 of the vehicle. As can be appreciated, side 204 represents the passenger side of the vehicle. A similarly constructed curtain air bag will also be positioned along an opposing side of the vehicle.

The air bag 30 includes at least one inflatable region 32 and at least one inlet 35 configured to communicate inflation gas received at the inlet to the inflatable region 32. Region 34, when inflated, is across the front side window 216 of the vehicle (see FIG. 4). In one embodiment of the invention, the curtain air bag 30 includes another or second main inflatable region 34. Regions 32 and 34 are positioned on either side of an uninflatable region or area 36. Additional uninflated and inflatable regions can be added to the air bag. In the illustrated embodiment, air bag 30 additionally includes a second inlet 38 in fluid communication with inflatable region 34. The construction and placement of the regions 32, 34 and 36 are more clearly shown in FIG. 4, which is a cross-sectional view of the inflated air bag 30. As can be seen, each of the main inflatable regions 32 and 34 is formed by two opposing panels of material 40 and 42. As mentioned above, the air bag 30 is preferably constructed utilizing a one-piece weaving technique utilizing a Jacquard loom. With a Jacquard loom the panels 40 and 42 are automatically formed during the weaving process and include fewer threads than in the joined-together regions of the air bag 30, such as the border regions and the uninflated regions of the air bag. Depending upon the desired permeability through the panels, the air bag can be coated (with urethane, silicone, or other like material) after it is woven or each panel can be coated prior to attachment to each other.

Figure 4:
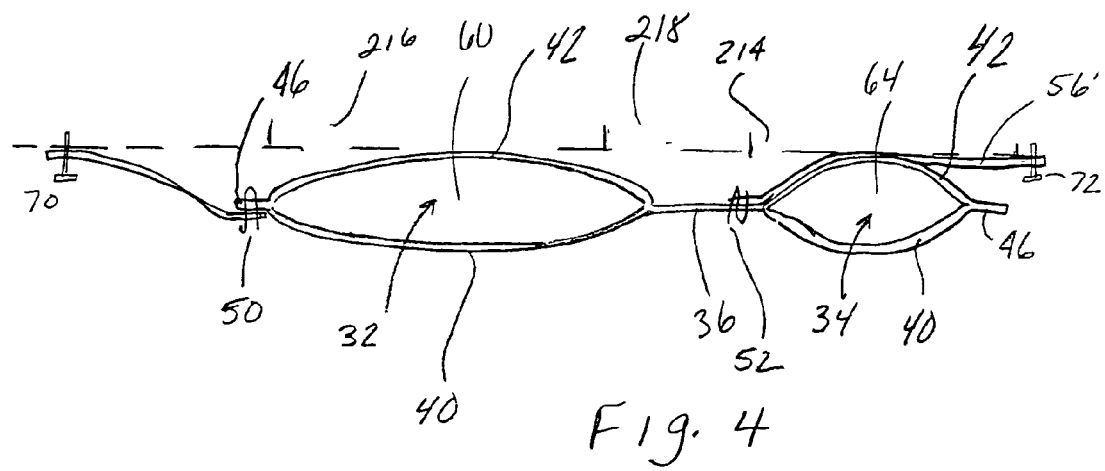
FIG. 4 is a cross-sectional view through section 4—4 of FIG. 3.

Reference is again made to FIG. 1 and more particularly to the dotted lines 50 and 52. These dotted lines represent the location of sewn seams, which are used to attach separate panels of material 54 and 56 to selected portions 58 and 60 of the air bag 30. The panels 54 and 56 operate as anchors or tethers to connect these selected portions 50 and 52 of the air bag to cooperating parts of the vehicle 200 as shown in FIGS. 3 and 4. Fasteners such as 70 and 72, shown diagrammatically in FIG. 4, may be used to secure the panels 54 and 56 respectively to parts of the vehicle frame.

Each triangular tether or anchor panel 54 is sewn along the seam 50 to the air bag 30. The opposite end 55 of panel 54 is secured to the A-pillar 210 of the vehicle. The panel 56 is also triangular in shape and end 57 of panel 56 is secured to the C-pillar 212 of the vehicle. In the illustrated embodiment the end of panel 56 is secured proximate the side 37 of the uninflated region 36. As can be seen in FIG. 4, the tether or anchor panel 56 is positioned between that portion of the air bag forming the second inflatable zone 34. When inflated, the anchor panel 56 will be positioned in front of the vehicle window 214 (see FIG. 4). In this manner, panel 56 acts as a net or barrier preventing the occupant from being thrown from the vehicle. While not illustrated, the tether panel can also be located at the end of the rear of facing side 64 of the air bag.

Reference is briefly made to FIG. 1 and more particularly to the plurality of tabs 80 formed as part of the upper border 82 of the air bag 30. Each of the tabs 80 includes a central region 84 connected to the upper border 82 as well as two opposing side regions 86. Each of the side regions 86 of each tab 80 is connected to a corresponding center region 84 of the tab 80, however, in the preferred embodiment each lateral region is disconnected from the upper border 82. Each side region 86 of a tab 80 is folded about a corresponding fold line 87 and positioned behind the center portion 84 of the tab 80. In this manner the center portion 84 and the two folded-back side regions 86 form three layers of material increasing the holding strength of the tab 80. Reference is briefly made to FIG. 3 showing a plurality of tabs 80 mounted to the roof rail 220 of the vehicle and an individual fastener inserted through the triple thickness of tab material and then secured to the roof rail or mating threadable connector previously inserted in the roof rail. Reference is briefly made to FIG. 1 and more particularly to the rearmost tab 80a. As can be seen, this tab 80a includes the center portion 84 and one lateral tab 86, which is folded rearward about fold line 86 prior to receipt of a fastener such as 90.

As mentioned above, the air bag 30 includes two inlets 35 and 38 respectively. Reference is briefly made to FIG. 7, which illustrates an enlarged portion of the inlet area of air bag 30 and more particularly shows the connection of the two inlets 35 and 38 and inflator 100. The inflator 100 can be any of a known variety of air bag inflators and includes one or more exit ports 102. The exit port or ports 102 are communicated through a connection tube 104 to the inlet 106 of a tee-connector 108. The tee-connector 108 includes outlets 110a and 110b communicated respectively to one of the inlets 35 and 36 of the air bag.

Reference is again made to FIG. 1. At a minimum, the air bag 30 may include one inflatable region 32 or, as illustrated, a plurality of inflatable regions 32 and 34 separated by an uninflated region 36. Part of the regions 32 and 34 is formed in part by borders 46, 46a, 46b and 82, which are integrally formed on the Jacquard loom during the weaving process. Inflatable region 32 includes a plurality of restrictions 120, which extend upwardly from the lower border 46 and which are also formed during the weaving process. In principle each restriction 120 forms a small uninflatable region and is formed in the same manner as region 36. The purpose, however, of the restriction or restrictions 120 is to narrow the distance between the lower portions of panels 40 and 42, narrowing the lower portion of inflatable region 32.

Inflatable region 32 additionally includes another set of restrictions 124, which extend from a side border 46a (or 46b) and/or upper border 82 and which are generally positioned along the top of the inflatable region 32. The region 32 may include another type of restriction 126, which does not extend to or from the upper border 82 but which connects the panels 40 and 42 in the upper extremes of the inflatable region 32. As can be seen, the restriction 126 is closely positioned to inlet 35 and defines a plurality of flow paths 130 to direct the communication of inflation gas from inlet 35 to the inflatable region 32. In general, the air bag 30 may have the restrictions 120, 124, and 126 expand generally from a peripheral border. For the purpose of generality, FIG. 1 shows additional restrictions 120' extending from the side borders of region 32.

Reference is briefly made to FIG. 2, which illustrates the construction of one of the restrictions 120, 120', 124 and 126. Each restriction includes a stem 140, which extends from a proximate border region such as 46, 48a, 46b and 82 and the restrictions such as 120 include an enlarged region or head 142. In the preferred embodiment the thickness of the stem 140 is approximately 3–5 mm while the head 142 is in the range of approximately 30 mm. The stem includes a radiused or arcuately shaped base portion 144, which extends from the border regions of the air bag. The arcuately shaped base region 144 avoids concentrating forces into a narrow area. As mentioned above, in the preferred embodiment, the air bag 30 is manufactured utilizing a Jacquard loom; consequently the restrictions are also interwoven structures. Alternatively, the restrictions 120, 124, and 126 can be sewn into the air bag, thereby joining the opposing panels 40 and 42 together. If a sewn seam were used, its shape would follow the shape of the stem and head of each restriction shown in FIGS. 1 and 2. The enlarged head serves as a pressure relieving mechanism to avoid concentrating forces on narrow portions of the air bag, which might damage the air bag as its internal pressure increases.

As can be seen from FIGS. 5 and 5a, the greatest separation between the panels 40 and 42 is in a central portion of the inflatable region 32, which by design will correspond to the location of the seated occupant. For example, points 150, 152 and 154 show the impact point of the head of occupants respectively categorized as fifth, 50th and 95th percentile occupants.

As can be appreciated, the restrictions 120, 124 and 126 also serve to assist in defining the shape of the inflated air bag. If the air bag 30 did not include the peripheral extending restrictions, upon inflation, region 32 would approach the shape of a circular cylinder. Additionally, as the air bag becomes more inflated, the lower edge of the air bag will move upwardly as the region assumes its more circular, inflated shape. This upward movement might sufficiently displace the air bag so that it does not effectively cushion the occupant.

As can be seen, most of the restrictions 120, 122 and 124 face the centrally inflated portion 160 of the inflatable region 32. This configuration permits those portions 162 between adjacent restrictions to be filled quickly.

The rear inflatable region 34 is of similar construction to the forward inflatable region 32. The region 34, as mentioned above, includes a plurality of restrictions such as 120 and 124, a major inflatable region 164 proximate the center of region 34a and a plurality of minor inflatable regions 166 located between adjacent restrictions and borders.

Reference is briefly made to FIG. 1 or FIG. 3. As can be seen, inflatable regions 32 and 34 are linked by a common passage 170 located beneath the uninflated region 36 to facilitate the exchange of inflation gas between inflatable regions 32 and 34. The passage 170 is part of a greater chamber 172, situated within portions of the uninflated region to facilitate the flow of inflation gas from any inflatable chamber once reacted upon by an occupant.

Figure 8:
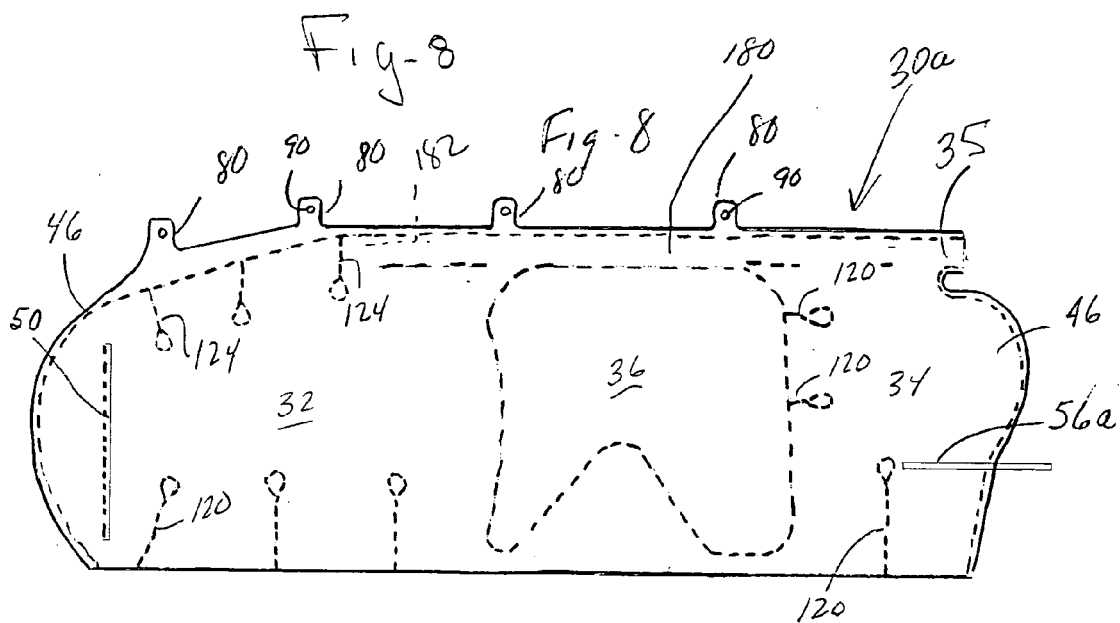
FIGS. 8 and 9 show alternate embodiments of the invention.

Reference is briefly made to FIG. 8, which illustrates an alternate air bag 30a. This air bag also includes two Inflatable chambers 32 and 34 and an uninflatable region 36 as well as a plurality of restrictions extending peripherally into respective inflatable regions. The lateral borders 46a and 46b of air bag 30a are more noticeably curved than in the air bag 30. Air bag 30 shows the use of a single inlet 35, which is communicated to a source of inflation gas (not shown). The uninflated region 36 is configured to form a narrow passage 180, which assists in communicating inflation gas from the inlet to each of the inflatable chambers. Alternatively, a distribution tube 182 (made of metal, plastic or fabric) can be inserted within the inlet and communicated to the inflator (not shown) to distribute the gases to the inflatable regions 32 and 34. The rear inflatable region 34 can be secured to an adjacent vehicle pillar by a panel 56 in the manner described above or by a thin strap or cord 56a.

Figure 9:
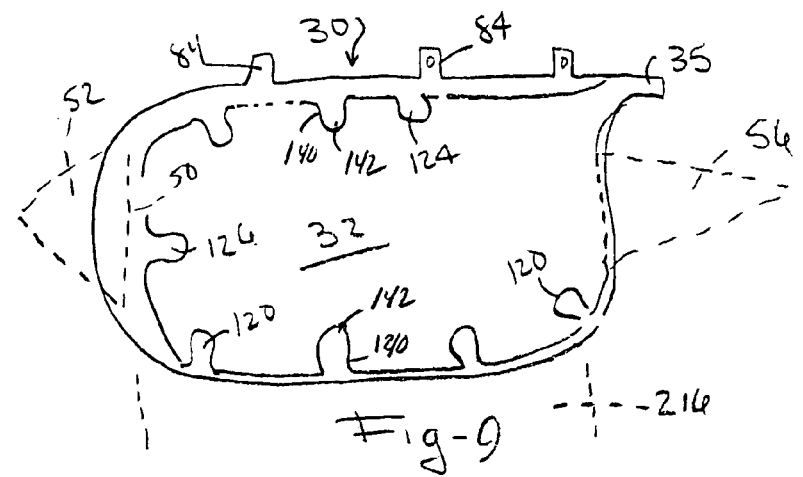

FIG. 9 shows an air bag 30 with a single inflatable region 32. Region 32 is positioned in front of an adjacent vehicle window 216. The air bag includes a plurality of tabs 80 to mount the bag near the roof rail of the vehicle. The inflatable region 32 is in part defined by a plurality of restrictions, seams or joints generally-shown as numerals 120, 124 and 126. Each of the restrictions 120, 124 and 126 generally extends away from the periphery of the inflatable region 32 and extends toward the center of the inflatable regions 32 in the manner shown in the earlier figures. The restrictions shown in FIG. 9 are more bulbous in shape than those shown in FIG. 2. The restrictions of FIG. 9 include wider and shorter stems 140 and relatively large heads 142. An advantage of this type of restriction, seam or joint 120, 124 and 126 is lower stress.

Figure 10:
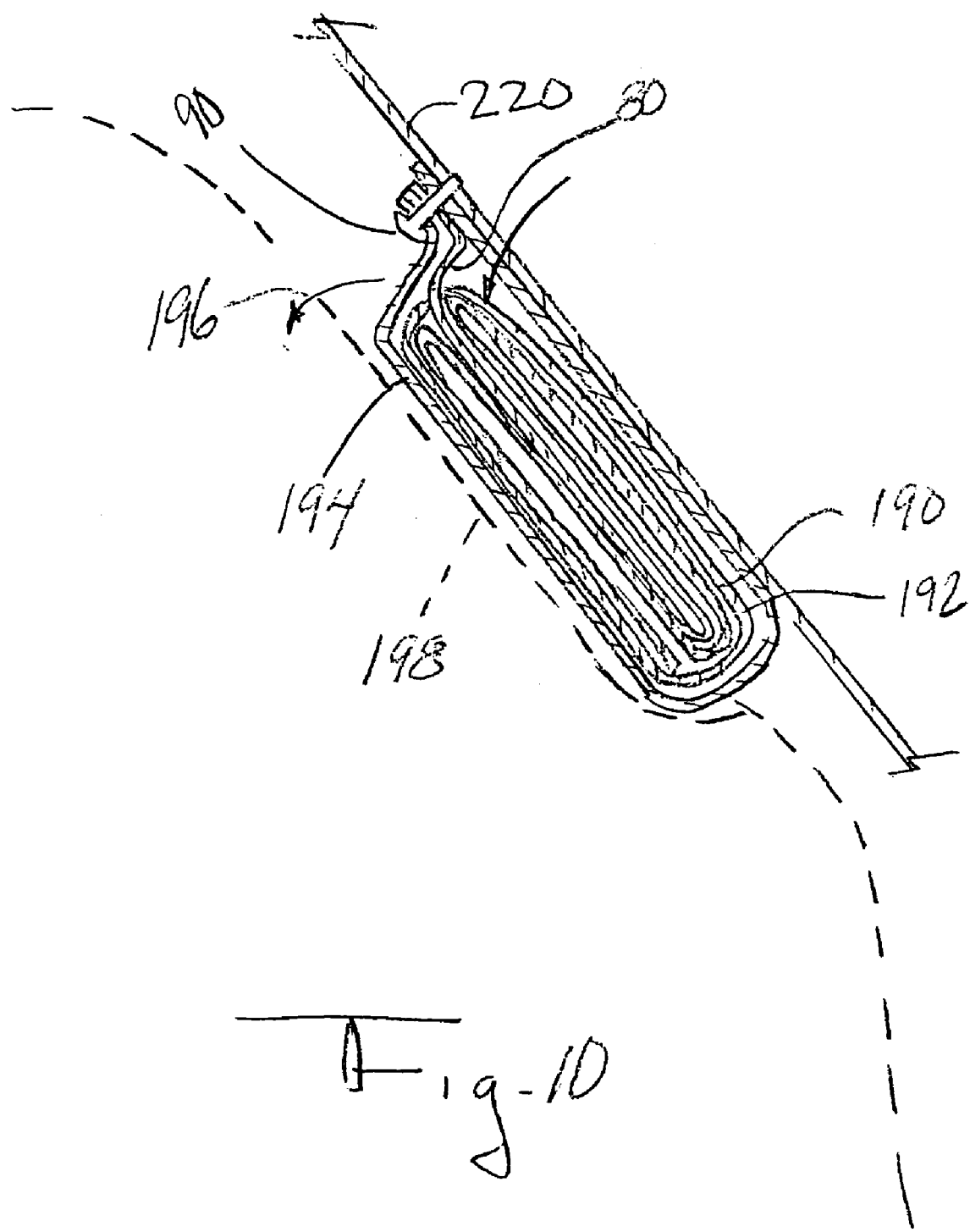
FIG. 10 shows a folded curtain air bag mounted proximate a roof rail of a vehicle.

Reference is briefly made to FIG. 10, which is a cross-sectional view of air bag 30, folded and mounted to the vehicle proximate the roof rail 220. The generally planar air bag 30 has been folded into a number of interlinked accordion pleats 190. Generally, each of the pleats extends from the front end to the rear end of the air bag. After the air bag has been folded it resembles a thin cylinder having a small D/L (folded diameter to length) ratio. For example, the diameter of the folded air bag may be about 38 mm (1.5 inches) to about 76 mm (3 inches). The folded air bag 30 can be placed in a long, thin, tearable, flexible fabric or flexible plastic casing 192. The tabs 80 of the air bag extend through the opening in the casing 192. The casing and folded air bag are protectively enclosed by a clamshell housing 194. The housing 194, the casing 192 and air bag 30 are secured proximate the roof rail 20 by the fasteners 90, each received through a corresponding tab 80. As the air bag 30 inflates with gas it expands, bursting the casing and opening the housing 194. The direction of opening of the housing 194 is shown by arrow 196. The housing 194 pushes away the fascia 198, which normally hides the air bag, permitting the air bag to expand and become situated along a side of the passenger compartment.

Many changes and modifications in the above-described embodiment of the invention can, of course, be carried out without departing from the scope thereof. Accordingly, that scope is intended to be limited only by the scope of the appended claims.

The invention claimed is:

1. An air bag assembly 20 comprising:
an air bag 30 including at least a first inflatable region 32, 34 of determinable size, the inflatable region having a plurality of restrictions 120, 124, 126 peripherally located about the inflatable region, wherein the plurality of restrictions includes a first set of restrictions extending from a top uninflated portion of the air bag toward the central region and a second set of restrictions extending from a bottom uninflated portion so as to form a plurality of inflatable portions 162 having parallel sides, said first and second sets of restrictions being non-overlapping within the bag;
the restrictions configured to permit the first inflatable region of the air bag to achieve its maximum inflatable size in a central region interior to the plurality of restrictions, the central region configured to extend, upon inflation of the air bag, laterally substantially from a front to a rear of the first inflatable region, the size of the central region is determinable by the length of each of the first and second set of restrictions, wherein end or terminus portions of individual restrictions of the first set of restrictions are generally opposingly facing relative to individual restrictions of the second set of restrictions and wherein the individual restrictions of the first and second sets are generally parallel to and laterally off-set from each other.

2. The air bag as defined in claim 1 including the second set of restrictions extending from a bottom uninflated portion of the air bag toward the central region.

3. An air bag assembly (20) comprising:
an inflatable air bag comprising at least a first inflatable region or chamber, the first inflatable chamber or region including opposing panels of flexible material, the first inflatable chamber configured to have a top, middle and lower region, the middle region when the air bag is inflated is configured to be the widest of the top, middle and lower regions; the lower region including a first plurality of restrictions, which restrict portions of the lower region from inflating, the middle region extending laterally across the first inflatable chamber and being generally parallel to the top and lower regions and not having any restrictions extending through a top and/or lower boundary of a medial region, the top region including a second plurality of restrictions which prevent portions of the top region from inflating, the first inflatable chamber having an uninflatable top edge, a bottom edge, a first side edge and a generally opposite second side edge;
the plurality of generally parallel first restrictions includes a first set of restrictions, each restriction of the first set of restrictions which define an inflatable portion 162 having generally parallel sides having a base located in or extending from the bottom edge, a body extending generally pependicular from the base and having a distal end, each distal end located a predetermined distance above the bottom edge and each distal end of the first set of restrictions defining the lower boundary of the middle region; the plurality of second restrictions includes a second set of restrictions, each restriction of the second set of restrictions having a base, and a body having a distal end, each distal end located a predetermined distance below the top edge and each distal end of the second set of restrictions defining the top upper boundary of the middle region.

4. The curtain air bag according to claim 3 wherein the distal ends of each of the restrictions of the first set of restrictions are located about the same distance from the bottom edge of the air bag.

5. The curtain air bag according to claim 3 wherein the distal ends of the restrictions of the second set of restrictions are located about the same distance from the top edge of the air bag.

6. The curtain air bag according to claim 3 including a third set of restrictions formed generally with a U-shape and configured as a second base having first and second ends and including stems extending from a respective one of the first and second ends of the second base, each of the stems extending to a distal end.

7. The curtain air bag according to claim 6 wherein the second base is spaced from the top edge forming an inflatable region between the second base and the top edge.

8. The curtain air bag according to claim 6 wherein each stem is orientated along a vertical line.

9. A curtain air bag having two major inflatable chambers, the air bag configured to inflate from a folded configuration at or about a roof rail of a vehicle to an inflated condition covering an interior side portion of the vehicle's passenger compartment, the passenger compartment including a windowed area, the air bag including a rear facing surface which when inflated faces away from the passenger compartment and lies adjacent the windowed area, the air bag comprising:
 a first inflatable chamber having a forward side region which faces a forward portion of the vehicle when the chamber is inflated and an oppositely facing rear side region;
 a non-inflatable region having a forward side region operatively secured to the rear side region of the first inflatable chamber and located generally at the rear side region of the first inflatable chamber, the non-inflatable region also including an oppositely facing rear side region as well as a rear facing surface which faces away from the passenger compartment;
 the second inflatable chamber having a forward side region operatively secured proximate the rear side of the non-inflatable region, the second inflatable chamber also having a rear side region, and when inflated a rear facing surface of the second inflatable chamber is configured to be placed in front of the windowed area of the vehicle;
 a first tether having a first side thereof secured to the forward side region of the first inflatable chamber and having another portion securable to a first portion of the vehicle's passenger compartment;
 a second tether having a first side region secured proximate the rear side region of the non-inflatable region, the second tether extending behind the rear facing surface of the second inflatable chamber when the second inflatable chamber is inflated, wherein a distal end of the second tether is configured to be secured to the vehicle, the second tether configured to act as a barrier to prevent an occupant of the vehicle from being thrown from the vehicle.

10. An air bag assembly comprising:
 an inflatable air bag comprising at least a first inflatable region or chamber, having a plurality of first restrictions, extending generally perpendicular to and vertically upward from a portion of the periphery of the inflatable region, and a second plurality of restrictions, extending generally vertically downward from and generally perpendicular to an opposing portion of the periphery of the inflatable region, each restriction, of the first set is spaced from each other so as to form an inflatable portions 162 there between, wherein individual restrictions of the first restrictions, are each generally misaligned horizontally and non-overlapping vertically relative to opposing individual restrictions of the second restrictions, the opposing and spaced restrictions configured to locally restrict the inflation of the inflatable region between adjacent restrictions and configured to permit the inflatable region to achieve a maximum width in a region generally between opposing restrictions;
 wherein an imaginary vertical line beginning from an end point of some of the first restrictions and extending toward some of the second restrictions is positioned between two of the second restrictions.

11. An air bag assembly comprising:
 an inflatable air bag comprising at least a first inflatable region or chamber having a forward side and a rear side, the first inflatable region configured to have a medial portion that extends generally from the forward side to the rear side; the medial portion located generally between a lower portion and an upper portion each of which also extends from the forward side to the rear side, further the first inflatable region includes a plurality of first restrictions 120, extending generally perpendicular to and vertically upward from the lower portion of the first inflatable region, and a plurality of inflatable portions 162 having parallel sides and a second plurality of restrictions 124, extending generally vertically downward from the upper portion the first inflatable region, each of the plurality of first and second restrictions, including a body portion joined to a distal end, wherein the distal end of each of the first plurality of restrictions does not extend through a lower edge of the medial portion and wherein the distal end of each of the second plurality of restrictions does not extend through an upper edge of the medial portion.

12. The air bag assembly according to claim 11 wherein the distal ends of the first plurality of restrictions, are generally laterally misaligned relative to generally individual restrictions of the second plurality of restrictions.

13. The assembly as defined in claim 12 wherein at least some of the distal ends of the second set of restrictions include a stem portion and end portion are formed in a bulbous shape.

14. The assembly as defined in claim 13 wherein the end portions of the first set of restrictions interdigitate relative to the end portions of the second set of restrictions.

* * * * *